United States Patent [19]

Kordulla et al.

[11] 4,339,097
[45] Jul. 13, 1982

[54] TARGET SEEKING HEAD FOR A MISSILE

[75] Inventors: Hans Kordulla, Singen; Hans H. Gerlach, Owingen; Dirk Jansen, Überlingen, all of Fed. Rep. of Germany

[73] Assignee: Bodenseewerk Geratetechnik GmbH, Überlingen, Fed. Rep. of Germany

[21] Appl. No.: 152,202

[22] Filed: May 22, 1980

[30] Foreign Application Priority Data

May 25, 1979 [DE] Fed. Rep. of Germany ....... 2921228

[51] Int. Cl.³ .............................................. F41G 7/22
[52] U.S. Cl. .................................................. 244/3.16
[58] Field of Search ................. 244/3.16; 74/5 R, 5.4, 74/5.41, 5.42, 5.43

[56] References Cited

U.S. PATENT DOCUMENTS

| | | | |
|---|---|---|---|
| 3,920,200 | 11/1975 | Evans et al. | 244/3.16 |
| 4,004,754 | 1/1977 | Cox et al. | 244/3.16 |
| 4,009,848 | 3/1977 | Albert et al. | 244/3.16 |
| 4,030,807 | 6/1977 | Briney | 244/3.16 |

FOREIGN PATENT DOCUMENTS 1406578 5/1974 Fed. Rep. of Germany .
1501166 10/1967 France .

Primary Examiner—Charles T. Jordan
Attorney, Agent, or Firm—Howard H. Darbo

[57] ABSTRACT

A target seeking head mounted in the dome of a missile comprises a gyro rotor including a mid-portion forming a convex calotte-shaped peripheral surface. The convex calotte-shaped peripheral surface is surrounded substantially concentrically by a concave calotte-shaped bearing surface stationary with respect to the missile. A small gap is formed between the two surfaces and pressurized gas is introduced into the gap to form a gas bearing centering the gyro in the center of curvature of the convex calotte-shaped peripheral surface thereof. A target seeking scanning device comprises an annular parabolic mirror formed at the mid-portion of the gyro and a plane mirror imaging a field of view located in infinity in the plane of a detector mounted stationary with respect to the missile.

7 Claims, 1 Drawing Figure

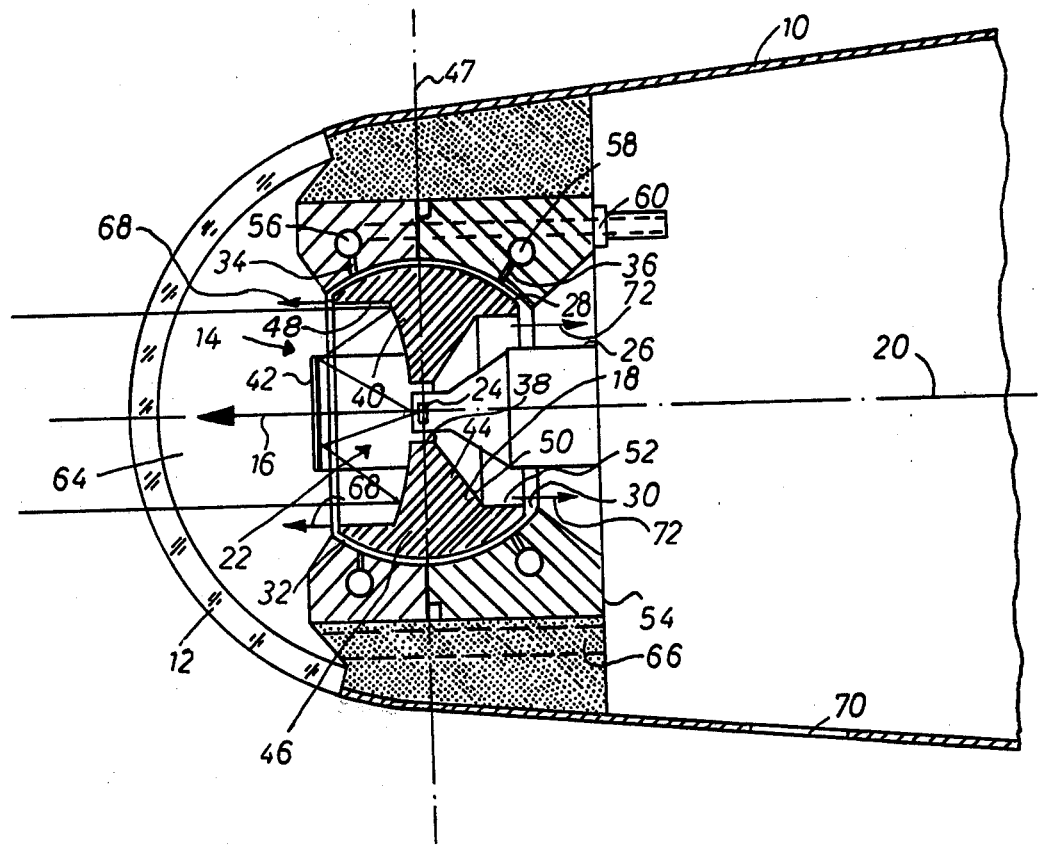

TARGET SEEKING HEAD FOR A MISSILE

The invention relates to a target seeking head for a missile, comprising:
a gyro rotor mounted for rotation about a spin axis, which rotor is mounted in the missile for angular movement of its spin axis with two degrees of freedom, and a target field scanning device with an optical system arranged on the gyro rotor, and a central, stationary detector.

Such a target seeking head is for example known from the German Pat. No. 1 406 578.

In the prior art target seeking head the gyro rotor is universally angularly movable and mounted on a central supporting member for rotation about its spin axis. It is mounted, for example, by means of a gimbal arrangement with ball bearings. The gyro rotor carries a target field scanning device, which comprises an optical system in the form of a folded mirror optics with an annular concave mirror and a plane mirror. A field of view located in infinity is imaged by the concave mirror, over the plane mirror in an image plane. A modulation disc (reticle) rotating with the gyro rotor is located in the image plane. A detector responding to the radiation of a target to be followed is arranged on the central supporting member and is exposed to the radiation passing through the modulation disc. The gyro rotor with the target field scanning device is arranged at the tip of a missile, which tip is closed by a radiation transparent dome.

In the prior art target seeking head the gyro rotor is radially magnetized and surrounded by an annular coil. The signals of the detector are amplified and applied to the annular coil and exert torques on the radially magnetized gyro rotor, by which torques the spin axis of the gyro rotor and therewith the optical axis of the target field scanning device are precessed to a target and caused to follow this target continuously. The signals applied to the annular coil are at the same time applied to the control system of the missile.

By the gyro rotor interfering motions of the missile are neutralized at the target field scanning device. The target field scanning device operating with a rather narrow field of view is aligned to a target and continuously caused to follow the target. The signals applied to the annular coil and to the control system are proportional to the angular speed of the sight line in space, as it is required for proportional navigation. The gyro rotor is for example accelerated to its operational speed of rotation by blowing gas under pressure against it and then runs freely down during the flight of the missile.

Target seeking heads of this type are transiently subjected to high accelerations and are then locked and supported, in order to dissipate the acceleration forces. The prior art constructions with Cardan joints and ball bearings require very expensive supporting and locking devices. The limit of the acceleration stability is achieved, where supporting of all structural elements and thus dissipation of the forces is no longer possible. With ball bearings the limit is there, where the balls are pressed into the bearing surface.

A further disadvantage of the prior art target seeking head is that the gimbal arrangement requires comparatively much space. Thereby only little space is available for the detector.

The gimbal bearings of the gimbal arrangement have a friction not to be neglected. In order to achieve sufficient stabilizing qualities of the gyro rotor in spite of this friction, a rather large moment of inertia and thus a rather large weight of the gyro rotor is required. This large weight of the gyro rotor complicates supporting against high accelerations.

It is the object of the invention to design a target seeking head of the type defined in the beginning, such that supporting of the gyro rotor with high accelerations is facilitated, more space is available for the detector, and by reduction of the friction, good stabilizing qualities are achieved also with a gyro rotor having small weight.

According to the invention this object is achieved in that (a) the gyro rotor has a convex calotte-shaped peripheral surface, (b) this surface is surrounded by a concave calotte-shaped bearing surface substantially concentric thereto and stationary with respect to the missile, while forming a narrow air gap, and (c) pressurized gas conduits open into the bearing surface, through which conduits pressurized gas is permitted to be introduced into the air gap for centered air bearing of the gyro rotor, freely movable to all sides.

In the arrangement according to the invention the central gimbal arrangement is omitted, whereby more space is available in the center for example for the detector. The rotor is mounted through a gas bearing, whereby the friction is reduced. Thus the required stabilizing qualities can be achieved throughout the whole flight phase also with use of a smaller and more lightweight gyro rotor. Because the ball radii of the peripheral and bearing surfaces differ only very slightly, the gyro rotor engages the bearing surface with its peripheral surface virtually areally, at high accelerations. Thereby the acceleration forces can be dissipated via a rather large engaging surface, without lasting deformations occuring. Supplementary supporting mechanisms are not required.

It is known to design the gyro rotor of a free gyro as a ball, which is arranged in a hollow-spherical bearing surface while forming a narrow air gap, pressurized gas being permitted to be introduced via pressurized gas conduits into this air gap, which gas retains the ball centered to the bearing surface. The ball rotates about a spin axis. Furthermore it is mounted for free angular motion with its spin axis relative to the bearing surface (French Pat. No. 1 501 166). This prior art arrangement is not a target seeking head but a position gyro for navigation purposes, with which the position of the spin axis is picked off as reference direction.

There the completely ball-shaped design of the gyro rotor is an essential characteristic. The gyro rotor is not allowed to be supported on the bearing surface with high accelerations.

Further modifications of the invention are subject matter of the sub-claims.

An embodiment of the invention will now be described in greater detail with reference to the accompanying drawing, which shows a longitudinal selectional view through the top of a missile with a target seeking head.

At its top, the missile 10 has a dome 12 transmitting the used radiation, for example infrared radiation, behind which dome a target seeking head 14 is arranged. The target seeking head 14 comprises a gyro rotor 18 mounted for rotation about a spin axis 16, which rotor is mounted in the missile 10 for angular movement of its spin axis 16 with two degrees of freedom. In the illustration of the FIGURE, the spin axis 16 coincides with the missile longitudinal axis 20. Furthermore the target seeking head 14 comprises a target field scanning device with an optical system 22 arranged on the gyro rotor 18 and a central detector 24, which is arranged stationary on the supporting member 26. The gyro rotor 18 has a convex calotte-shaped peripheral surface 28. This surface 28 is surrounded by a concave calotte-shaped bearing surface 30 substantially concentric thereto and stationary with respect to the missile, while forming a narrow air gap 32. Pressurized gas conduits 34, 36 open into the bearing surface 30, through which conduits pressurized gas is permitted to be introduced into the air gap for centered air bearing of the gyro rotor, freely movable to all sides. The gyro rotor 18 is annular and the detector 24 is arranged inside the central aperture 38 of the gyro rotor 18, stationary in the center of curvature of the bearing surface 30.

The target seeking scanning device comprises the optical system 22 in form of a folded mirror optics with an annular parabolic mirror 40 and a plane mirror 42, a field of view located in infinity being imaged by the parabolic mirror 40 via the plane mirror 42 in the plane of the detector 24 or on a modulation disc arranged in front of the detector. The parabolic mirror 40 is formed by the target side of the end face of the solid gyro rotor 18.

The gyro rotor 18 has a mid-portion 44 of substantially annular disc-shape provided with a central aperture 38 and forming the parabolic mirror 40 and an outer portion 46 of substantially sleeve-like shape, forming the convex calotte-shaped peripheral surface 28 and extending on both sides axially beyond the mid-portion 44 and pressurized gas conduits open into the bearing surface 30 in two circular arrays 34, 36 which are arranged substantially symmetric to the radial midplane 47 of the bearing surface 30. On one side the mid-portion 44 forms the parabolic mirror 40, to which a cylindrical inner face 48 of the outer portion 46 is connected. On the other side the mid-portion 44 forms, adjacent the aperture 38, a truncated cone-shaped surface 50, to which a cylindrical inner surface 52 of the outer portion 46 is connected. The dimension is selected such that the mass central point of the gyro rotor 18 including the plane mirror 42 is located in the center of curvature of the convex calotte-shaped peripheral surface 28.

The mass of the gyro rotor 18 is displaced outwards by the sleeve-like outer portion, such that with predetermined total mass the moment of inertia is increased. Also a rather large peripheral surface 28 results, through which the gyro rotor 18 is supported. The diameter of the inner surface 52 is a little smaller than the diameter of the inner surface 48, and the surface 50 extends axially a bit further than the parabolic mirror 40, such that the larger mass of the gyro rotor 18 compensates the mass of the plane mirror 42 arranged on the target side and the mounting on the backward side, and the mass center of gravity of the gyro rotor 18 with the plane mirror 42 is located in the center of curvature of the peripheral surface 28.

The bearing surface 30 is provided in a partition 54 extending perpendicular to the missile longitudinal axis 20. The partition 54 contains a pair of annular conduits 56, 58 substantially symmetrical to the radial mid-plane 47 around the longitudinal axis 20, which conduits communicate with a pressurized gas supply conduit 60. The pressurized gas conduits 34 and 36 are formed by radial bores, which extend from the bearing surface 30 to the annular conduits 56, 58. The missile 10 has a radiation transmitting dome 12 on the target side of the partition 54, which dome forms the top of the missile 10. This dome together with the partition 54 defines a chamber 64. At least one longitudinal conduit 66 for venting the pressured gas is provided in the partition 54, which gas flows out of the pressurized gas conduits 34 through the air gap 32 between peripheral surface 28 of the gyro rotor 18 and bearing surface 30 into the chamber 64, as indicated by the arrows 68. The housing of the missile 10 has lateral outlet openings 70 for the pressurized gas rearward of the partition 54, which gas flows through the longitudinal conduit 66 or, as indicated by the arrows 72, from the pressurized gas conduits 36 through the air gap 32 to the rearward side of the partition 54.

In the target seeking head described the gyro rotor 18 is mounted through an air bearing by means of a bearing surface 30. This air bearing permits low-friction rotation of the gyro rotor 18 about its spin axis 16 as well as the universally angular alignment of the spin axis 16 with the target relatively to the missile 10. The bearing surface 30 serves, at the same time, for supporting the gyro rotor 18 with high accelerations, when the air bearing is not effective, the gyro rotor 18 engaging the bearing surface 30 substantially aerally, such that high accelerations can be taken up without lasting deformation of the portions.

The target seeking head 14 can be aligned to the target in known manner, for example as set forth in the German Pat. No. 14 06 578.

We claim:
1. Target seeking head for a missile, comprising:
a gyro rotor mounted for rotation about a spin axis, which rotor is mounted in the missile for angular movement of its spin axis with two degrees of freedom, and a target field scanning device with an optical system arranged on the gyro rotor, and a central, stationary detector,
characterized in that
(a) the gyro rotor (18) has a convex calotte-shaped peripheral surface (28),
(b) this surface (28) is surrounded by a concave calotte-shaped bearing surface (30) substantially concentric thereto and stationary with respect to the missile, while forming a narrow air gap (32), and
(c) pressurized gas conduits (34,36) open into the bearing surface (30), through which conduits pressurized gas is permitted to be introduced into the air gap (32) for centered air bearing of the gyro rotor (18), freely movable to all sides.

2. Target seeking head as set forth in claim 1, characterized in that
(d) the gyro rotor (18) is annular and
(e) a detector (24) of the target field scanning device is arranged stationary in the center of curvature of the bearing surface (30).

3. Target seeking head as set forth in claim 2, characterized in that
(f) the target field scanning device comprises an optical system (22) in form of a folded mirror optic with an annular parabolic mirror (40) and a plane mirror (42), a field of view located in infinity being imaged by the parabolic mirror (40) via the plane mirror (42) in the plane of the detector (24) and
(g) the parabolic mirror (40) is formed by the target side of the end face of the solid gyro rotor (18).

4. Target seeking head as set forth in claim 3, characterized in that
(h) the gyro rotor (18) has a mid-portion (44) of substantially annular disc-shaped provided with a central aperture (38) and forming the parabolic mirror (40) and an outer portion (46) of substantially sleeve-like shape, forming the convex calotte-shaped peripheral surface (28) and extending on both sides axially beyond the mid-portion (44) and
(i) the pressurized gas conduits open into the bearing surface (30) in two circular arrays (34,36) which are arranged substantially symmetric to the radial mid-plane (47) of the bearing surface (30).

5. Target seeking head as set forth in claim 4, characterized in that
(j) the bearing surface (30) is provided in a partition (54) extending perpendicular to the missile longitudinal axis (20),
(k) the partition (54) contains a pair of annular conduits (56,58) substantially symmetrical to the radial mid-plane (47) around the longitudinal axis (20), which conduits communicate with a pressurized gas supply conduit (60) and
(l) the pressurized gas conduits (34,36) are formed by radial bores, which extend from the bearing surface (30) to the annular conduits (56,58).

6. Target seeking head as set forth in claim 5, characterized in that
(m) the missile (10) has a radiation transmitting dome (12) on the target side of the partition (54), which dome forms the top of the missile (10),
(n) longitudinal conduits (66) for venting the pressurized gas are provided in the partition (54), which gas flows out of the pressurized gas conduits (34,36) through the air gap (32) between peripheral surface (28) of the gyro rotor (18) and bearing surface into the chamber defined by the dome (12) and the partition (54), and
(o) the housing of the missile (10) has lateral outlet openings (70) for the pressurized gas, rearward of the partition (54).

7. Target seeking head as set forth in anyone of claims 1 to 6, characterized in that the mass center of the gyro rotor (18) is located in the center of curvature of the convex calotte-shaped peripheral surface (28).

* * * * *